United States Patent
Paese et al.

[11] Patent Number: 5,915,665
[45] Date of Patent: Jun. 29, 1999

[54] LATCHING SOLENOID VALVE

[75] Inventors: Andrew J. Paese, Plymouth; Lee Karsten, Random Lake; John Quella, Kohler; Kevin Witt, Sheboygan, all of Wis.

[73] Assignee: Kohler Co., Kohler, Wis.

[21] Appl. No.: 08/957,890

[22] Filed: Oct. 27, 1997

[51] Int. Cl.⁶ .................................................. F16K 31/08
[52] U.S. Cl. ............................ 251/30.04; 251/45; 251/65
[58] Field of Search .............................. 251/30.02, 30.03, 251/30.04, 45, 65, 129.17, 129.15

[56] References Cited

U.S. PATENT DOCUMENTS

| | | |
|---|---|---|
| 3,814,376 | 6/1974 | Reinicke . |
| 4,056,255 | 11/1977 | Lace . |
| 4,534,537 | 8/1985 | Zukausky ................................ 251/45 X |
| 4,690,371 | 9/1987 | Bosley et al. . |
| 4,948,090 | 8/1990 | Chen ...................................... 251/65 X |
| 4,972,996 | 11/1990 | Cerny . |
| 5,010,911 | 4/1991 | Grant . |
| 5,449,142 | 9/1995 | Banick ................................... 251/30.04 |
| 5,584,465 | 12/1996 | Ochsenreiter . |
| 5,758,863 | 6/1998 | Buffet et al. ........................... 251/45 X |

*Primary Examiner*—Kevin Lee
*Attorney, Agent, or Firm*—Quarles & Brady

[57] ABSTRACT

A pilot valve is operated by a solenoid formed by a coil wound around a non-magnetic spool that has a bore. A rare earth permanent magnet is inside the bore adjacent one end and abuts a flux concentrator farther inside the bore. A plunger is slidably located within the bore biased away from the flux concentrator by a spring and projects out another end of the bore. An enclosure of magnetic material completes a magnetic flux path around the solenoid and has an aperture though which the plunger projects. The pilot valve includes a cage of rigid non-magnetic material which abuts the enclosure and has a recess which supports the plunger out of contact with the housing. The plunger selectively opens and closes a pilot tube through the cage to operate a diaphragm the responds by engaging a primary valve seat to control the flow of fluid through a valve body.

9 Claims, 2 Drawing Sheets

LATCHING SOLENOID VALVE

FIELD OF THE INVENTION

The present invention relates to solenoid actuated valves; and more particularly to such valves with latching type solenoid actuators.

BACKGROUND OF THE INVENTION

In hospitals, public restrooms and other facilities, it is desirable to provide a lavatory faucet which turns off automatically after a given period of time, so that the water will not run indefinitely if the user does not shut off the faucet. Conventional faucets for this type of operation, typically are referred to as "metering faucets" and are mechanical in nature being operated by a piston. When the piston is moved by the user to open the valve, a variable chamber within the valve expands and fills with air or water. Upon being released by the user, the piston moves due to spring force and decreases the size of the chamber at a rate which is governed by the release of the air or water through a metering orifice. This restricts the rate at which the spring force moves the piston to close the valve and thus the period that water flows from the faucet. Among the draw backs with such a mechanical faucet is that the mechanical parts wear with repeated use and the metering orifice clogs, eventually requiring either replacement or periodic adjustment and cleaning to ensure the valve remains open for a satisfactory period of time for the user to wash.

As an alternative to these mechanical automatic faucets, electrically controlled solenoid valve models have been proposed. However, a conventional solenoid valve remains open only while an electric current is applied to an electromagnetic coil of the solenoid actuator. Upon removal of the electric current, a spring forces the solenoid to close the valve. As a result solenoid valves use a considerable amount of electricity which makes them impractical for battery powered operation. Therefore, power typically is supplied from the electrical wiring of the building, thus requiring an electrical outlet underneath the lavatory and protection against the user receiving an electrical shock in the event of a circuit failure.

SUMMARY OF THE INVENTION

A general object of the present invention is to provide a latching type solenoid actuator.

Another object is to provide such a latching solenoid valve with a permanent magnet located within an electromagnetic coil.

A further object of the present invention is to provide such a valve which is capable of being powered by a battery for a relatively long time between battery replacement.

These and other objectives are satisfied by a latching solenoid which has a spool of non-magnetic material with a bore. A solenoid coil is wound on the spool to form an electromagnet that produces a magnetic field when an electric current flows through the coil. A permanent magnet is located within the bore of the spool along with a flux concentrator of magnetically permeable material. A plunger is slidably located within the bore and projects axially outward from the spool.

A housing of magnetically permeable material encloses the spool and has a first member that contacts either the permanent magnet or the flux concentrator. A second member of the housing has an aperture through which the plunger extends without contacting the second member, to minimize friction effects on the plunger.

The solenoid operates a pilot valve mechanism that includes a cage of non-magnetic material is coupled to the housing and has a recess that receives and supports an end of the plunger. The cage includes a pilot tube which has a passage having a first opening into the recess with a pilot valve seat around that first opening.

A valve body is coupled to the housing and has an inlet and an outlet. The inlet communicates with the outlet through an aperture and a primary valve seat extends around that aperture. A resilient diaphragm selectively engages the primary valve seat to close the aperture. The resilient diaphragm has a through passage within which the pilot tube is tightly received.

DETAILED DESCRIPTION OF THE INVENTION

Figure 1:
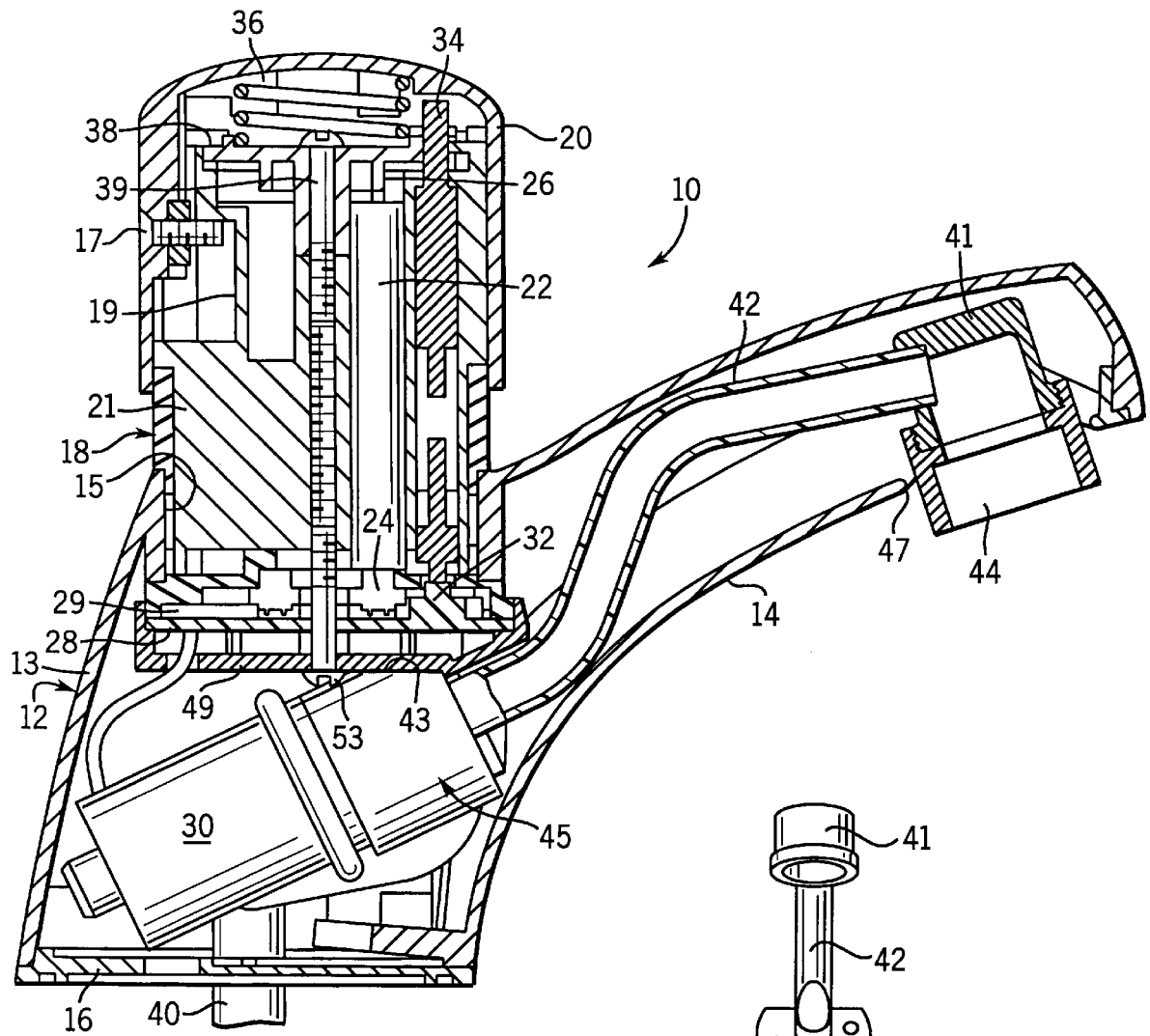
FIG. 1 is a cross section view through an automatic self-closing faucet which incorporates a latching solenoid valve according to the present invention.

With initial reference to FIG. 1, a faucet 10 has a hollow body 12 with a spout 14 projecting upward and away from the main portion 13 of the hollow body. The body has a base plate 16 adapted to mount on the surface of a lavatory or on a counter top adjacent a lavatory. The upper portion of the hollow body 12 has a cylindrical opening 15 which receives an actuator assembly 18 with a moveable top cap 20 that is slidably held in place by a screw 17 which enters a groove 19 in the actuator assembly core 21.

The actuator assembly 18 contains a battery 22 that is held against a pair of electrical contacts 24 and 26 by cover 38 fastened to the assembly body 21 by another screw 39. The top cap 20 and cover 38 can be removed easily to replace the battery without having to disconnect the faucet 10 from the water supply or having to access components beneath the surface on which the faucet is mounted. A printed circuit board 28, located within the hollow body 12, receives electric current from the battery via the battery contacts 24 mounter thereon. A housing 49 encloses the printed circuit board 28 providing protection against moisture damage and the screw 53 holding the housing in place also secures the actuator assembly 18 to the faucet body 12.

The printed circuit board 28 contains a timer circuit 29 and an electrical switch 32 for triggering the timer circuit. A switch push rod 34 extends downward through the actuator assembly 18 from just under the inside surface of top cap 20 to the switch 32 on the printed circuit board 28. A spring 36 also biases the top cap 20 away from the cover 38 and contact with switch push rod 34.

Figure 2:
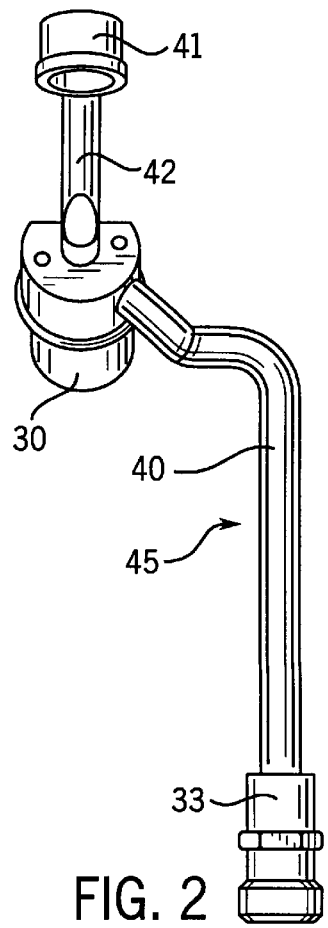
FIG. 2 illustrates the valve and tubing sub assembly of the faucet.

The electrical output of the timer circuit 29 drives a solenoid valve 30 within the faucet housing 12. The solenoid valve 30 is connected to a water inlet tube 40 extending downward through the base plate 16 of the faucet 10. A fitting 33 at the remote end of the inlet tube 40 contains a filter (not shown) which traps particles that could clod apertures of the solenoid valve 30. A tube 42 projects from solenoid valve 30 through the housing spout 14 to an outlet fitting 41 onto which an aerator 44 is threaded. The solenoid valve 30, inlet tube 40, spout tube 42 and outlet fitting 41 form an integral plumbing subassembly 45, as apparent from FIG. 2, which nests within the hollow body 12 of the faucet 10 shown in FIG. 1. Water flows only through the plumbing sub-assembly 45 and does not come into contact with the faucet body 12.

The plumbing subassembly 45 is prefabricated and then inserted as a unit through the open bottom of the faucet body 12. During insertion the spout tube is pushed upward into the spout 14 until the subassembly's outlet fitting 41 aligns with an opening 47 at the underside of the remote end of the spout 14. The aerator 44 then is screwed onto the outlet fitting through the spout opening 47. The solenoid valve 30 is pushed upward until a flat beveled surface 43 abuts the housing 49 that encloses the printed circuit board 28. Securing the base plate 16 across the bottom opening of the hollow body 12 holds the plumbing subassembly 45 in place with the inlet tube 40 projecting downward through that base plate. This procedure is reversed to remove the plumbing subassembly 45 for repair or replacement.

As will be described in greater detail, the top cap 20 is pushed downward by a user to activate the faucet. That movement of the actuator cap 20 presses push rod 32 downward, closing the switch 32 and activating the timer circuit 29 on printed circuit board 28. While the timer circuit is active, the solenoid valve 30 is in an open state allowing water from the inlet tube 40 to flow through the aerator 44.

Figure 3:
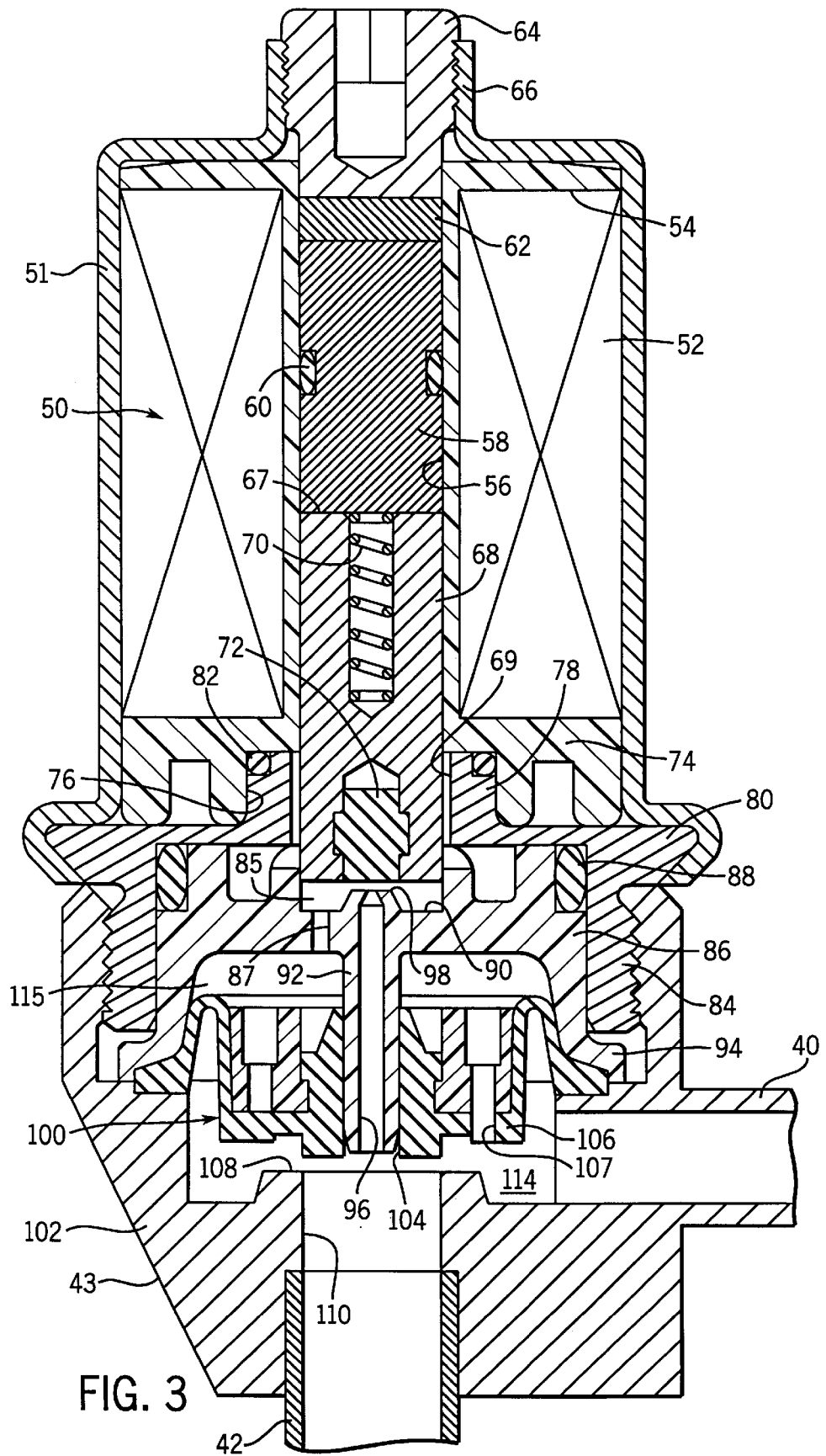
FIG. 3 is a cross sectional view of the latching solenoid valve.

With reference to FIG. 3, the solenoid valve 30 comprises a latching solenoid actuator 50 having an outer housing 51 that encloses an electromagnetic coil 52 wrapped around a spool 54 of non-magnetic material, such as a plastic. The outer housing 51 is fabricated of steel or other magnetically permeable material. The spool 54 has a bore 56 extending centrally therethrough within which is received a cylindrical, metal flux concentrator 58 which has an annular groove with an O-ring 60 therein. The flux concentrator 58 is surrounded by the solenoid coil 52. A permanent magnet 62 abuts an end of the flux concentrator 58 and is adjacent an outer end of bore 56. The flux concentrator 58 and O-ring 60 seal the bore of the spool 54 so that water in a lower portion of the valve does not reach the magnet 62. As a consequence, a rare earth magnet can be utilized which provides a relatively significant magnet force for its size. A pole piece 64 is threaded into an integral fitting 66 of the solenoid housing 51 and holds the magnet 62 within the spool bore against the flux concentrator 58. The pole piece 64 can be adjusted axially during assembly to compensate for manufacturing tolerances of the associated components.

A stainless steel plunger 68 is slidably located within spool bore 56 on the opposite side of the flux concentrator 58 from permanent magnet 62 and is biased away from the flux concentrator by a spring 70. The remote end of the plunger 68 has a recess with a resilient seal 72 captivated therein. This remote end of the plunger 68 projects outward from an internal end of spool 54.

That end of the spool 54 has outwardly extending flange 74 with an annular recess 76 extending around the opening of the spool bore 56. A cylindrical rim 78 of an end cap 80 of magnetically permeable material, such as stainless steel, is received within this recess 76 and is sealed there against by a second O-ring 82. The open end of the housing 51 is crimped around the edge of the end cap 80 which completes the enclosure for the solenoid actuator 50. An aperture, which extends through the cylindrical rim 78, has a diameter that is slightly larger than the outer diameter of the plunger 68 which projects therethrough, thereby forming a magnetic flux gap 69. This results in the plunger 68 being able to move axially without contacting the end cap 80. The end cap has a second larger diameter tubular projection 84 extending outward from the opposite side.

The pole piece 64, outer housing 51, end cap 80, plunger 68 and flux concentrator 58 create a magnetic flux path for the permanent magnet 62 and the electromagnet formed by coil 52. This flux path has a constant magnetic flux gap 96 between the plunger 68 and the end cap 80, and a variable magnetic flux gap 67 between the flux concentrator 58 and the plunger 68. The size of the variable magnetic flux gap changes as the plunger moves within the bore 56 as will be described.

A plug-like cage 86, fabricated out of rigid non-magnetic material such as plastic, has a closed end received within an opening of the second end cap projection 84 to create a cavity 85 there between. This cavity 85 is partially defined by a recess 90 in the cage 86 which receives the remote end of the plunger 68. The internal diameter of the recess 90 closely matches the outer diameter of the plunger 68 to guide the axial movement of the plunger while maintaining the outer surface of the plunger spaced from the magnetically permeable end cap 84. A third O-ring 88 provides a seal between the cage 86 and end cap 80. A bleed hole 87 provides a fluid passage from cavity 85 through the cage 86. The cage 86 has a pilot tube 92 which projects downward beyond an open rim 94 of the end cap 80. An aperture 96 through the pilot tube 92 has a raised opening facing the plunger 68 thereby providing a pilot valve seat 98. The plunger seal 72 engages this pilot valve seat 98 when the solenoid valve 30 is in the closed state, as will be described.

A diaphragm 100 of resilient material, such as rubber, extends across the open rim 94 of the cage 86 forming a pilot chamber 115 therebetween and is held in place by. The periphery of the diaphragm 100 is compressed between the cage 86 and a valve body 102 that is threaded onto the end cap 84. The diaphragm 100 has a central aperture 104 therethrough and the pilot tube 92 of the end cap fits tightly into that central aperture. A central portion 106 of the diaphragm 100 resides in an inlet 114 within the valve body 102 and has a bleed aperture 107 therethrough. In the closed state of the latching solenoid valve 30, the central portion 106 of the diaphragm 102 abuts a main valve seat 108 formed around an opening of an outlet 110 from the inlet 114 to the spout tube 42. The water pressure in inlet 114 is communicated through the bleed aperture 107 so that the pressure in the cavity 85 behind the diaphragm 100 is greater than in the outlet 110, thus maintaining the aperture between the inlet and outlet at valve seat 108 closed.

In the closed state of the solenoid valve 30, the plunger 68 is held against the pilot valve seat 98 at the opening of the pilot tube 92 by the force of spring 70 and any pneumatic or hydraulic force present, whereby the plunger seal 72 closes that opening. The axial magnetic force exerted to draw the plunger 68 toward permanent magnet 62 is determined by the length of variable magnetic flux gap 67 between flux concentrator 58 and the plunger, as well as the flux density in that magnetic flux gap. That magnetic force is decreased by making the magnetic flux gap 67 larger or the flux density smaller. The design of the plunger 68, flux concentrator 58 and permanent magnet 62 causes the gap's flux density to drop rapidly as this gap length increases. In the closed position of the plunger 68, the variable magnetic flux gap 67 is sufficiently large that the axial magnetic force exerted by permanent magnet 62 is minimized and can not overcome the spring force. Thus the plunger is latched in the closed position in the absence of electric current flowing through the coil 52.

A substantially constant magnetic flux gap 69 exists in the magnetic flux path between the plunger 68 and the end cap 80. The magnetic flux in this gap creates a radial force on the plunger which can cause an undesirable friction which impedes axial movement of the plunger 68. The present structure reduces the effect of this frictional force by supporting the adjacent end of the plunger 58 on the plastic cage 86. That support holds the plunger nearly centered in the magnetic flux gap 69 which minimizes the radial force and provides a low friction, low wear surface against which the plunger slides. By supporting the plunger with the plastic spool 54 and plastic cage 86, the constant magnetic flux gap 69 can be made relatively small which improves the efficiency of the latching solenoid actuator 50.

When a user presses the top cap 20 of the actuator assembly 18, the timer circuit 29 is activated and applies a brief electrical current pulse to the electromagnetic coil 52. The duration (e.g. 0.025 seconds) of this pulse is just long enough for the coil 52 to generate an additional magnetic field of the same polarity as the permanent magnet 62, which draws the plunger 68 farther into the coil spool bore 56 and away from the pilot valve seat 98 at the opening of the pilot tube 92 as illustrated in FIG. 3. The current pulse is sufficiently intense that the plunger 68 strikes flux concentrator 58 thereby eliminating the magnetic flux gap 67 in the magnetic flux path and thus maximizes the force from permanent magnet 62. This permanent magnet force is sufficient by itself to overcome the force of spring 70 and hold the plunger away from the opening of the pilot tube 92. In other words, the force from permanent magnet 62 now is greater than the spring force. Therefore the plunger is latched in the open state by the permanent magnet 62 at the end of the electric pulse from the timer circuit 29 at which point the magnetic field produced by the coil 52 terminates.

The distance of the plunger stroke is kept relatively short to minimize the energy required to move the plunger between the extreme positions of its travel. This plunger stroke is adjusted by moving the pole piece 64 into and out of the spool bore 56.

As the plunger 68 moves away from the pilot valve seat 98, the cage cavity 85 opens into pilot passage 96 which communicates with the spout tube 42. This relieves the pressure from within cavity 85 and within the pilot chamber 115 behind the diaphragm 100 via bleed hole 87. With that pressure released, pressure within the inlet 114 forces the diaphragm 100 away from the main valve seat 108 opening a passageway between the inlet and spout tubes 40 and 42. This allows water to flow through the valve and out the aerator 44.

When valve open period (for example three to eleven seconds) lapses, the timer circuit 29 automatically sends another pulse of electric current through the electromagnet coil 52 in the opposite direction to that of the first current pulse thereby producing a magnetic field of opposite polarity to that of permanent magnet 62. The timer circuit also generates that pulse when the user operates the switch 32 by pressing top cap 20 while the solenoid valve is open. This pulse produces an electromagnetic field, which substantially cancels the permanent magnet force, allowing the spring to force the plunger 68 out of the spool 54 and against the cage 86, closing the pilot passage 96. That motion also increases the variable magnetic flux gap 67 between the flux concentrator 58 and the plunger, so that at the end of the electrical pulse when the electromagnetic field terminates the force of the permanent magnet is reduced to less than the spring force. As a result the spring 70 maintains the plunger in the closed state.

With the plunger 68 sealed against the pilot valve seat 98 at the opening of the pilot tube 96, pressure in the pilot chamber 115 behind the diaphragm 100 becomes greater than the pressure in the outlet 110. As a result of this pressure differential, the diaphragm 100 is forced against the main valve seat 108 thereby closing the passageway between the inlet and spout tubes 40 and 42. The diaphragm 100 is maintained in this position until pressure is equalized by the plunger 68 once again moving away from the pilot valve seat 98. Because the plunger 68 engages the rigid cage 86 to close the pilot passage, it does not apply force directly to the diaphragm 100. This results in a gentler, quieter operation of the diaphragm.

What is claimed is:

1. A latching solenoid valve comprising:
    a solenoid having a bore and a coil for producing a magnetic field when an electric current flows there through;
    a permanent magnet located within the bore;
    a flux concentrator of magnetically permeable material located within the bore;
    a plunger of magnetically permeable material slidably located within the bore and projecting outward from the solenoid;
    an enclosure of magnetically permeable material containing the solenoid and having a first member that contacts one of the permanent magnet and the flux concentrator, and a second member with an aperture through which the plunger extends;
    a cage of non-magnetic material coupled to the enclosure and having a recess into which an end of the plunger is received and supported, the cage including a pilot tube with a first opening into the recess and with a second opening, the cage having a pilot valve seat around the first opening and a bleed hole extending through the cage from the recess;
    a valve body coupled to the enclosure and having an inlet and an outlet in communication through an aperture with the inlet, wherein a primary valve seat extends around the aperture; and
    a resilient diaphragm cooperating with the cage to form a chamber into which the bleed hole communicates, and responding to pressure within the chamber by selectively engaging the primary valve seat to close the aperture, the resilient diaphragm having a pilot aperture which communicates with the outlet and within which the pilot tube is received.

2. The latching solenoid valve as recited in claim 1 wherein the solenoid comprises a spool formed of non-magnetic material about which the coil is wound.

3. The latching solenoid valve as recited in claim 1 wherein the plunger has a resilient seal that selectively engages the a pilot valve seat.

4. The latching solenoid valve as recited in claim 1 wherein the flux concentrator includes a seal that prevents fluid from flowing through the bore past the flux concentrator.

5. A latching solenoid valve comprising:
    a housing of magnetic material having an open end and a closed end with threaded aperture;
    a pole piece is threaded into the threaded aperture;
    a spool formed of non-magnetic material within the housing and having a bore;
    a solenoid coil wound on the spool for producing a magnetic field when an electric current flows there through;
    a permanent magnet located within the bore of the spool and abutting the pole piece;

a flux concentrator of magnetically permeable material located within the bore of the spool abutting the permanent magnet;

a plunger of magnetic material slidably located within the bore of the spool and projecting outward from the spool;

a spring biasing the plunger away from the flux concentrator;

an end cap of magnetic material engaging the housing and closing the open end, the end cap having an aperture through which the plunger extends without contacting the end cap;

a cage of rigid non-magnetic material coupled to the end cap and having opposing first and second sides with the first side having a recess within which an end of the plunger is received and supported, the cage including a pilot tube having a pilot valve seat at one end which opens into the recess and having a second end, the cage further including a bleed hole extending between the recess and the second side;

a valve body coupled to the housing and including an inlet and an outlet in communication through an opening with the inlet, wherein a primary valve seat extends around the opening; and a resilient diaphragm adjacent the second side of the cage to form a pilot chamber there between, and responding to pressure within the chamber by selectively engaging the primary valve seat to close communication between the inlet and outlet, the resilient diaphragm having a pilot aperture within which the pilot tube is received wherein the second end of the pilot tube communicates with the outlet.

6. The latching solenoid valve as recited in claim 5 wherein the spring is within the bore of the spool.

7. The latching solenoid valve as recited in claim 5 wherein the permanent magnet is a rare earth magnet.

8. The latching solenoid valve as recited in claim 5 wherein the plunger has a resilient seal that selectively engages the a pilot valve seat.

9. The latching solenoid valve as recited in claim 5 wherein the flux concentrator includes a seal that prevents fluid from flowing through the bore past the flux concentrator.

* * * * *